US008571425B2

(12) United States Patent
Nakaie et al.

(10) Patent No.: US 8,571,425 B2
(45) Date of Patent: Oct. 29, 2013

(54) DETECTION DEVICE AND IMAGE FORMING APPARATUS

(75) Inventors: Katsuhiko Nakaie, Kanagawa (JP); Masao Ito, Kanagawa (JP); Fumio Furusawa, Kanagawa (JP); Junichi Morooka, Kanagawa (JP); Shusaku Yokota, Kanagawa (JP); Kota Ninomiya, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 266 days.

(21) Appl. No.: 13/089,023

(22) Filed: Apr. 18, 2011

(65) Prior Publication Data

US 2012/0099874 A1 Apr. 26, 2012

(30) Foreign Application Priority Data

Oct. 22, 2010 (JP) ................................ 2010-237995

(51) Int. Cl.
*G03G 15/00* (2006.01)
*H04N 1/04* (2006.01)

(52) U.S. Cl.
USPC .............................. 399/16; 358/474; 358/496

(58) Field of Classification Search
USPC .................... 356/455; 250/208.1, 200, 559.4; 358/474, 496, 493, 482; 399/204, 16, 399/22, 98, 111; 382/312, 482
See application file for complete search history.

(56) References Cited

U.S. PATENT DOCUMENTS

| | | | | |
|---|---|---|---|---|
| 5,489,995 | A | 2/1996 | Iso et al. | |
| 5,801,849 | A * | 9/1998 | Soloveychik et al. | 358/474 |
| 5,828,924 | A * | 10/1998 | Fukada et al. | 399/16 |
| 6,023,283 | A * | 2/2000 | Imai | 347/212 |
| 6,147,778 | A * | 11/2000 | Yamada et al. | 358/474 |
| 6,181,442 | B1 * | 1/2001 | Ogura et al. | 358/475 |
| 6,343,162 | B1 * | 1/2002 | Saito et al. | 382/312 |
| 7,864,383 | B2 * | 1/2011 | Shiraishi | 358/474 |

FOREIGN PATENT DOCUMENTS

| | | | |
|---|---|---|---|
| EP | 0573984 | B1 | 4/1999 |
| JP | 2010-114498 | A | 5/2010 |

OTHER PUBLICATIONS

Communication, dated Apr. 5, 2012, issued by the Australian Intellectual Property Office in corresponding Australian Application No. 2011202323.

* cited by examiner

*Primary Examiner* — Sang Nguyen
(74) *Attorney, Agent, or Firm* — Sughrue Mion, PLLC

(57) ABSTRACT

A detection device includes: a detection member that includes an emission member emitting a beam toward a transportation direction of a transportation path and a beam receiving member receiving a reflected beam of the beam emitted from the emission member, and that detects an image on a medium; a transmissive member that allows the beam emitted from the emission member and the beam reflected from the medium to be transmitted therethrough; and a support member that has an open portion blocked by the transmissive member, and that supports an upstream end portion of the transmissive member in the transportation direction of the medium at an upstream portion of the open portion toward the medium, an edge portion of a downstream portion of the open portion in the transportation direction being located closer to the emission member than a bottom surface of the transmissive member.

18 Claims, 13 Drawing Sheets

COMPARATIVE EXAMPLE

DETECTION DEVICE AND IMAGE FORMING APPARATUS

CROSS-REFERENCE TO RELATED APPLICATION

This application is based on and claims priority under 35 USC 119 from Japanese Patent Application No. 2010-237995 filed Oct. 22, 2010.

BACKGROUND

Technical Field

The present invention relates to a detection device and an image forming apparatus.

SUMMARY

The present invention provides a detection device capable of suppressing the jamming of a recording medium when an image formed on the recording medium is detected by emitting a beam to the medium while being transported and an image forming apparatus having the detection device.

According to a first aspect of the invention, there is provided a detection device including a detection member that includes an emission member emitting a beam toward a transportation direction of a transportation path at which a medium is transported and a beam receiving member receiving a reflected beam of the beam emitted from the emission member, and that detects an image on the medium transported at the transportation path; a transmissive member that is disposed between the transportation path and the emission member and that allows the beam emitted from the emission member and the beam reflected from the medium to be transmitted therethrough; and a support member that has an open portion blocked by the transmissive member, and that supports an upstream end portion of the transmissive member in the transportation direction of the medium at an upstream portion of the open portion toward the medium, an edge portion of a downstream portion of the open portion in the transportation direction being located closer to the emission member than a bottom surface of the transmissive member.

BRIEF DESCRIPTION OF THE DRAWINGS

Exemplary Embodiments of the present invention will be described in detail based on the following figures, wherein.

DETAILED DESCRIPTION

An example of a detection device and an image forming apparatus according to an exemplary embodiment of the invention will be described.

(Overall Configuration)

Figure 1:
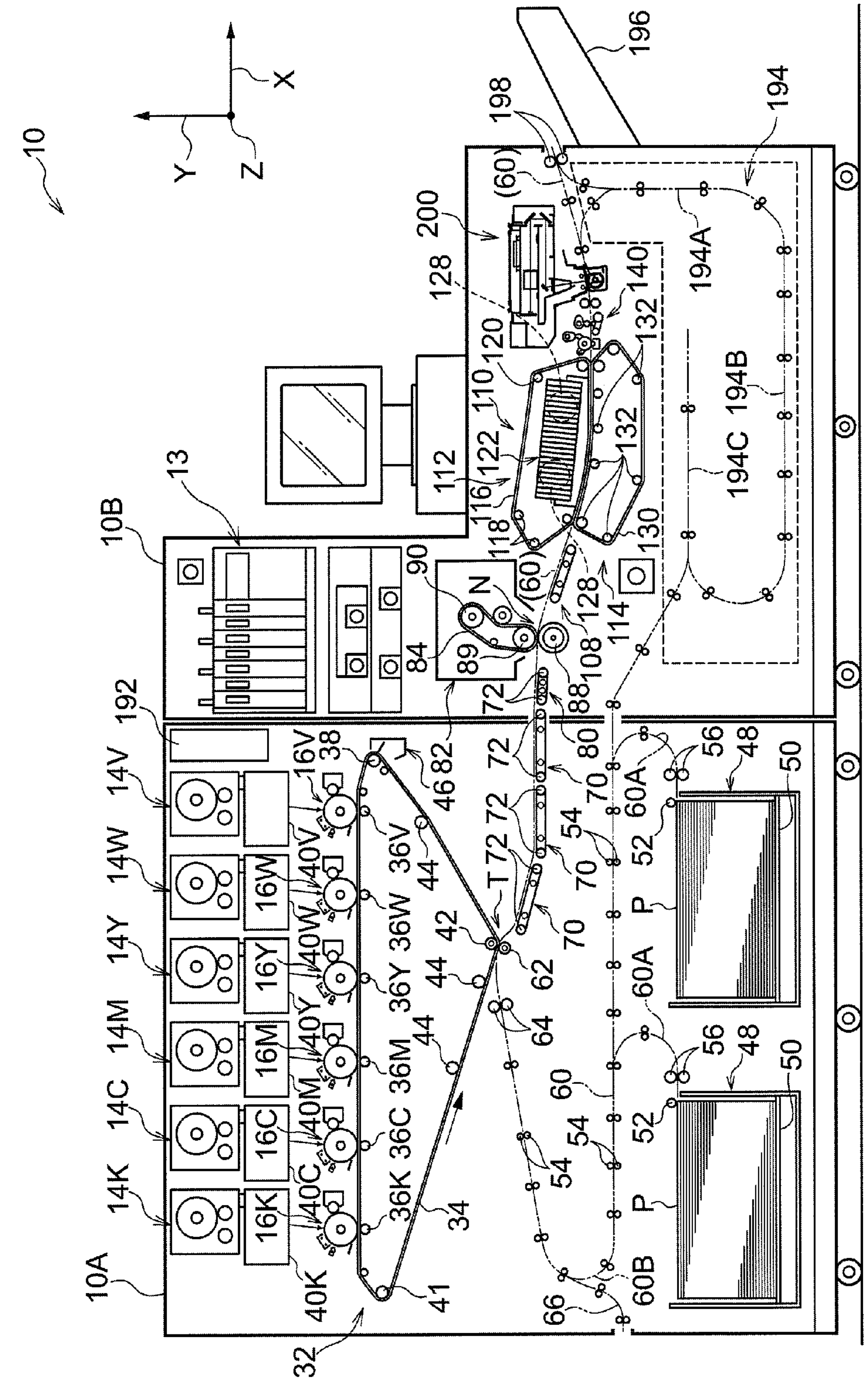
FIG. 1 is an entire diagram showing an image forming apparatus according to an exemplary embodiment of the invention.

FIG. 1 shows an image forming apparatus 10. The image forming apparatus 10 is configured to form a color image or a monochrome image, and includes a first processing unit 10A which is disposed at the left side when it is seen from the front side of the image forming apparatus and a second processing unit 10B which is attachable to or detachable from the first processing unit 10A and is disposed at the right side when it is seen from the front side thereof. Housings of the first processing unit 10A and the second processing unit 10B include plural frame materials. Furthermore, in the following description, the length direction of the image forming apparatus 10 (the secondary scanning direction as the transportation direction of a recording medium P which is an example of a medium) is set as the X direction, the height direction of the image forming apparatus is set as the Y direction, and the depth direction of the image forming apparatus (the primary scanning direction) is set as the Z direction.

The upper portion of the first processing unit 10A is provided with toner cartridges 14V, 14W, 14Y, 14M, 14C, and 14K which are arranged in the horizontal direction to be replaceable and respectively accommodate toners of a first specific color (V), a second specific color (W), yellow (Y), magenta (M), cyan (C), and black (K).

Furthermore, the first specific color and the second specific color are appropriately selected from colors (including transparent colors) other than yellow, magenta, cyan, and black. Further, in the following description, if it is necessary to distinguish the respective components related to the first specific color (V), the second specific color (W), the yellow (Y), the magenta (M), the cyan (C), and the black (K), several characters V, W, Y, M, C, and K are added to the reference numerals thereof. On the other hand, if it is not necessary to distinguish the respective components related to the first specific color (V), the second specific color (W), the yellow (Y), the magenta (M), the cyan (C), and the black (K), several characters V, W, Y, M, C, and K are omitted.

Furthermore, at the downstream of the toner cartridges 14, six image forming units 16, which are examples of six image forming units corresponding to toners having respective colors, are disposed in the X direction to respectively correspond to the toner cartridges 14. Then, an exposure device 40 provided for each image forming unit 16 is configured to receive the image data subjected to an image process at an image signal processing unit 13 provided above the second processing unit 10B, and to emit a beam L modulated in accordance with the image data to a photo conductor 18 (refer to FIG. 2) to be described later.

Figure 2:
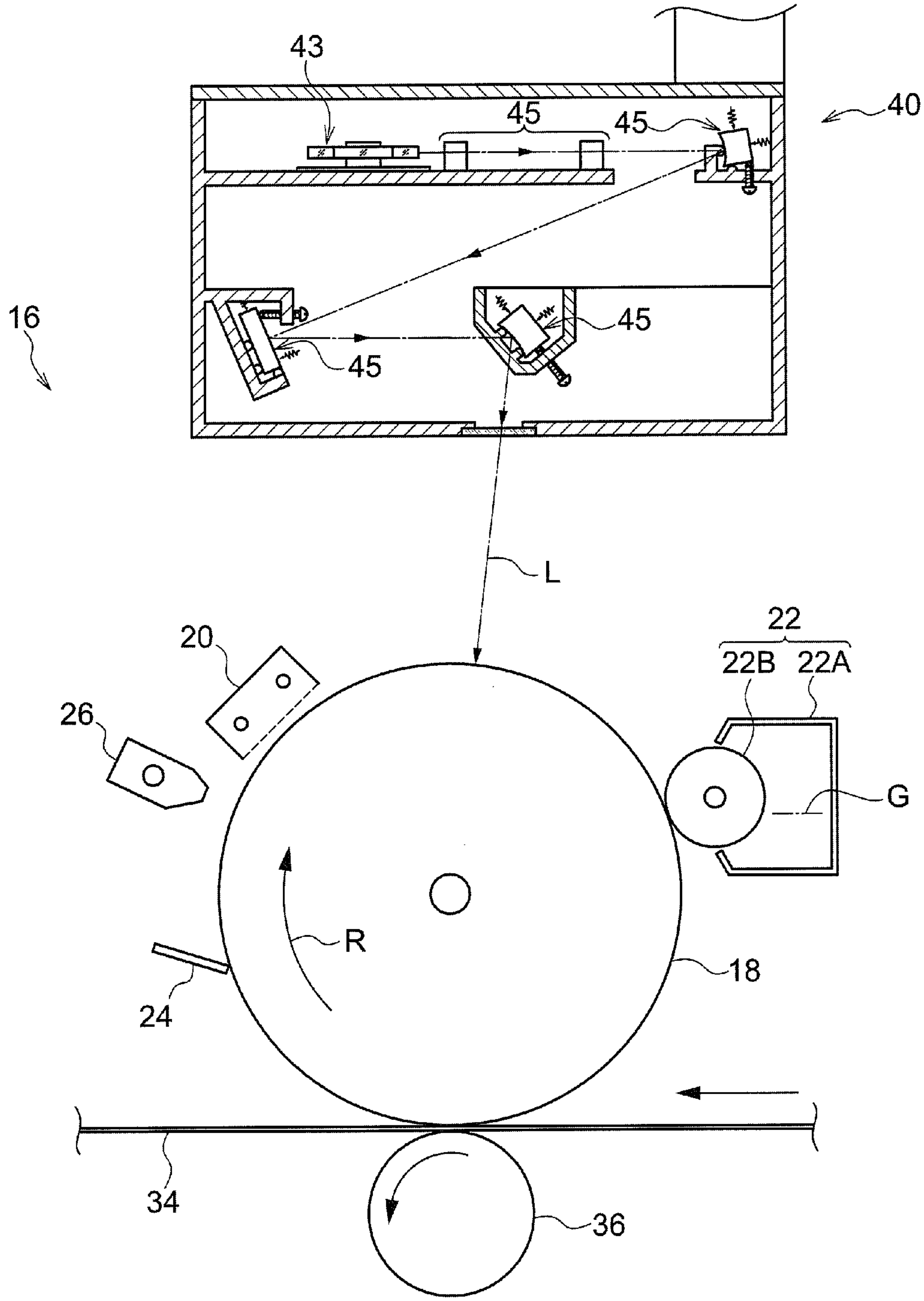
FIG. 2 is a configuration diagram showing an image forming unit according to the exemplary embodiment of the invention.

As shown in FIG. 2, each image forming unit 16 includes the photo conductor 18 which is rotationally driven in the direction indicated by the arrow R (in the clockwise direction of the drawing). In each photo conductor 18, an electrostatic latent image is formed thereon by emitting a beam L from each exposure device 40 thereto. Here, the exposure device 40 performs an exposure in a manner such that the exposure device scans a beam emitted from a beam source (not shown) in the primary scanning direction by a polygonal mirror 43 and emits the beam L to the outer peripheral surface of the photo conductor 18 by plural optical components 45 including an fθ lens and a reflection mirror.

Around each photo conductor 18, there are provided a corona discharge type (a non-contact charge type) scorotron charger 20 which charges the photo conductor 18, a developing device 22 which develops the electrostatic latent image formed on the photo conductor 18 by the exposure device 40 using a developing agent (toner), a blade 24 which serves as a removing member removing a developing agent remaining on the photo conductor 18 after a primary transfer operation, and a neutralization device 26 which performs a neutralization process by emitting a beam to the photo conductor 18 after the developing agent is removed by the blade 24. Then, the scorotron charger 20, the developing device 22, the blade 24, and the neutralization device 26 are disposed to face the surface of the photo conductor 18, and are sequentially arranged in this order from the upstream of the rotation direction of the photo conductor 18 to the downstream thereof.

The developing device 22 includes a developing agent accommodation member 22A which accommodates a developing agent G containing toner and a developing roll 22B which supplies the developing agent accommodated in the developing agent G accommodation member 22A to the photo conductor 18. The developing agent accommodation member 22A is connected to the toner cartridge 14 (refer to FIG. 1) through a toner supply path (not shown), and toner is supplied from the toner cartridge 14 thereto.

On the other hand, as shown in FIG. 1, a transfer unit 32 is provided below each image forming unit 16. The transfer unit 32 includes an annular intermediate transfer belt 34 of which the outer peripheral surface contacts the outer peripheral surface of each photo conductor 18 and a primary transfer roll 36 which serves as a primary transfer member transferring the toner image formed on each photo conductor 18 onto the intermediate transfer belt 34 in multiple layers.

The intermediate transfer belt 34 is wound on a driving roll 38 driven by a motor (not shown), a tension applying roll 41 applying a tension to the intermediate transfer belt 34, an opposite roll 42 facing a secondary transfer roll 62 to be described later, and plural winding rolls 44, and is moved by the driving roll 38 to circulate in one direction (the counterclockwise direction in FIG. 1).

Each primary transfer roll 36 is disposed to face the photo conductor 18 of each image forming unit 16 with the intermediate transfer belt 34 interposed therebetween. Further, a transfer bias voltage having polarity opposite to the polarity of the toner is applied to the primary transfer roll 36 by a power feeding unit (not shown). With this configuration, the toner image formed on the photo conductor 18 is transferred onto the intermediate transfer belt 34.

A removing device 46 is provided at the opposite side of the driving roll 38 with the intermediate transfer belt 34 interposed therebetween to remove toner or paper dust remaining on the outer peripheral surface of the intermediate transfer belt 34 by allowing the blade to contact the outer peripheral surface of the intermediate transfer belt 34. Further, two recording medium accommodation units 48 are provided below the transfer unit 32 to accommodate the recording medium P such as sheet.

Each recording medium accommodation unit 48 is configured to be freely drawn out from the first processing unit 10A toward the front side in the Z direction. Further, a supply roll 52 is provided above one end side (the right side in FIG. 1) of each recording medium accommodation unit 48 to supply the recording medium P from each recording medium accommodation unit 48 to a transportation path 60. Furthermore, a bottom plate 50 is provided inside each recording medium accommodation unit 48 to load the recording medium P thereon. The bottom plate 50 is configured to move downward by a command of a control unit (not shown) when the recording medium accommodation unit 48 is drawn out from the first processing unit 10A. As the bottom plate 50 moves downward, a space for allowing a user to supplement the recording medium P therein is formed in the recording medium accommodation unit 48.

When the recording medium accommodation unit 48 drawn out from the first processing unit 10A is attached to the first processing unit 10A, the bottom plate 50 is configured to move upward by the command of the control unit. Then, as the bottom plate 50 moves upward, the uppermost recording medium P loaded on the bottom plate 50 contacts the supply roll 52. Further, a separation roll 56 is provided at the downstream side in the recording medium transportation direction of the supply roll 52 (hereinafter, simply referred to as a "downstream") to separate one by one the recording medium P supplied from the recording medium accommodation unit 48 in an overlapping state. Plural transportation rolls 54 are provided at the downstream of the separation roll 56 to transport the recording medium P to the downstream side in the transportation direction.

The transportation path 60 provided between the recording medium accommodation unit 48 and the transfer unit 32 extends to the transfer position T between the secondary transfer roll 62 and the opposite roll 42 so that the recording medium P supplied from the recording medium accommodation unit 48 is folded back to the left side in FIG. 1 at a first folding back portion 60A and is folded back to the right side in FIG. 1 at a second folding back portion 60B.

A transfer bias voltage having polarity opposite to the polarity of the toner is applied to the secondary transfer roll 62 by a power feeding unit (not shown). Then, the toner images of respective colors transferred onto the intermediate transfer belt 34 in multiple layers are secondly transferred onto the recording medium P transported along the transportation path 60 by the secondary transfer roll 62.

Further, a preliminary path 66 extends from the left side surface of the first processing unit 10A to be merged with the second folding back portion 60B of the transportation path 60. Then, the recording medium P supplied from another recording medium accommodation unit (not shown) disposed adjacent to the left side of the first processing unit 10A is configured to enter the transportation path 60 through the preliminary path 66.

On the other hand, plural transportation belts 70 as an example of a transportation unit transporting the recording medium P having a toner image transferred thereto toward the second processing unit 10B is provided at the downstream of the transfer position T at the transportation path 60 of the first processing unit 10A. Further, a transportation belt 80 as an example of a transportation unit transporting the recording medium P transported from the transportation belt 70 toward the downstream is provided at the second processing unit 10B.

Each of the plural transportation belts 70 and the transportation belt 80 is formed in an annular shape, and is wound on a pair of winding rolls 72. The pair of winding rolls 72 is respectively disposed at the upstream and the downstream side in the transportation direction of the recording medium P, and one winding roll is rotationally driven so that the transportation belt 70 and the transportation belt 80 are circulated in one direction (the clockwise direction in FIG. 1). Further, a fixing unit 82 is provided at the downstream of the transportation belt 80 to fix the toner image transferred onto the surface (having an image formed thereon) of the recording medium P to the recording medium P by heat and pressure.

The fixing unit 82 includes a fixing belt 84 disposed above the transportation path 60 (the side having an image in the recording medium P) and a pressurizing roll 88 disposed to contact the lower side of the fixing belt 84 with the transportation path 60 interposed therebetween. Then, a fixing unit N is provided between the fixing belt 84 and the pressurizing roll 88 to fix the toner image by heating and pressurizing the recording medium P.

The fixing belt 84 is formed in an annular shape, and is wound on the driving roll 89 and the driven roll 90 respectively disposed at the upper and lower sides. The driving roll 89 faces the upper side of the pressurizing roll 88, and the driven roll 90 is disposed above the driving roll 89. Further, each of the driving roll 89 and the driven roll 90 includes a heating unit such as a halogen heater. Accordingly, the fixing belt 84 is heated.

A transportation belt 108 is provided at the downstream of the fixing unit 82 to transport the recording medium P supplied from the fixing unit 82 to the downstream. The transportation belt 108 has the same configuration as that of the transportation belt 70. Further, a cooling unit 110 is provided at the downstream of the transportation belt 108 to cool the recording medium P heated by the fixing unit 82.

The cooling unit 110 includes an absorption device 112 which absorbs heat of the recording medium P and a pressing device 114 which presses the recording medium P against the absorption device 112. The absorption device 112 is disposed at one side of the transportation path 60 (the upper side in FIG. 1), and the pressing device 114 is disposed at the other side (the lower side in FIG. 1).

The absorption device 112 includes an annular absorption belt 116 which contacts the recording medium P and absorbs heat of the recording medium P. The absorption belt 116 is wound on a driving roll 120 transmitting a driving force to the absorption belt 116 and plural winding rolls 118. Further, a heat sink 122 made of aluminum is provided at the inner peripheral side of the absorption belt 116 to come into plane-contact with the absorption belt 116 to emit heat absorbed to the absorption belt 116. Furthermore, a fan 128 is disposed at the rear side of the second processing unit 10B (the inner side of the paper in FIG. 1) to discharge the heat of the heat sink 122 to the outside thereof.

The pressing device 114 includes an annular press belt 130 which is an example of a transport unit transporting the recording medium P while pressing the recording medium P against the absorption belt 116. The press belt 130 is wound on plural winding rolls 132.

Further, a correction device 140 is provided at the downstream of the cooling unit 110 at the transportation path 60 to correct a curl of the recording medium P while transporting the recording medium P in an interposed state. Then, an inline sensor 200 is provided at the downstream of the correction device 140 at the transportation path 60 as an example of a detection device detecting a toner density defect, an image defect, an image position defect of the toner image fixed to the recording medium P, and a position or a shape of the recording medium P. Furthermore, the inline sensor 200 will be described in detail later.

A discharge roll 198 is provided at the downstream of the inline sensor 200 at the transportation path 60 to discharge the recording medium P having an image formed on one surface thereof to a discharge unit 196 attached to a side surface of the second processing unit 10B. On the other hand, when an image is formed on both surfaces of the recording medium P, the recording medium P supplied from the inline sensor 200 is transported to a reversing path 194 provided at the downstream of the inline sensor 200.

The reversing path 194 includes a branch path 194A which is branched from the transportation path 60, a sheet transportation path 194B which transports the recording medium P transported along the branch path 194A toward the first processing unit 10A, and a reversing path 194C which folds back the recording medium P transported along the sheet transportation path 194B in the reverse direction so that the front and rear surfaces thereof are reversed. With this configuration, the recording medium P of which the front and rear surfaces are reversed at the reversing path 194C is transported toward the first processing unit 10A, enters the transportation path 60 provided above the recording medium accommodation unit 48, and is transported to the transfer position T again.

Next, an image forming process of the image forming apparatus 10 will be described.

As shown in FIG. 1, first, the image data subjected to the image process at the image signal processing unit 13 is transmitted to each exposure device 40. Then, as shown in FIG. 2, in each exposure device 40, each beam L is emitted therefrom in accordance with the image data to expose each photo conductor 18 charged by the scorotron charger 20, so that an electrostatic latent image is formed thereon. Furthermore, the electrostatic latent image formed on the photo conductor 18 is developed by the developing device 22, so that the toner images of respective colors of the first specific color (V), the second specific color (W), the yellow (Y), the magenta (M), the cyan (C), and the black (K) are formed.

Subsequently, as shown in FIG. 1, the toner images of respective colors formed on photo conductors 18 (refer to FIG. 2) of the image forming units 16V, 16W, 16Y, 16M, 16C, and 16K are sequentially transferred to the intermediate transfer belt 34 by using six primary transfer rolls 36V, 36W, 36Y, 36M, 36C, and 36K in multiple layers. Then, the toner images of respective colors transferred onto the intermediate transfer belt 34 in multiple layers are secondly transferred onto the recording medium P transported from the recording medium accommodation unit 48 by the secondary transfer roll 62. The recording medium P having the toner images transferred thereto is transported to a fixing unit 82 provided inside the second processing unit 10B by the transportation belt 70.

Subsequently, in the fixing unit 82, the toner images of respective colors formed on the recording medium P are heated and pressurized, so that the toner images are fixed onto the recording medium P. Furthermore, the recording medium P having the toner images fixed thereto is cooled after passing through the cooling unit 110 and is transported to the correction device 140, so that the curl generated in the recording medium P is corrected. Furthermore, the recording medium P of which the curl is corrected is detected regarding to an image defect detection or the like by the inline sensor 200, and then is discharged to the discharge unit 196 by the discharge roll 198.

On the other hand, when an image is formed on a non-imaged surface at which an image has not been formed in the recording medium P (when an image is formed on both surfaces), the front and rear surfaces of the recording medium P passing through the inline sensor 200 are reversed at the reversing path 194, and is transported to the transportation path 60 provided above the recording medium accommodation unit 48. Then, the toner images are formed on the rear surface in accordance with the above-described procedure.

Furthermore, in the image forming apparatus 10 according to the exemplary embodiment, the components (the image forming units 16V and 16W, the exposure devices 40V and 40W, the toner cartridges 14V and 14W, and the primary transfer rolls 36V and 36W) forming the images of the first specific color and the second specific color may be attached to or detached from the first processing unit 10A as an additional component in accordance with the selection of the user. Accordingly, the image forming apparatus 10 may not include the components forming the images of the first specific color and the second specific color or any one of the components forming the images of the first specific color and the second specific color.

Next, the inline sensor 200 will be described.

(Basic Configuration of Inline Sensor 200)

Figure 3:
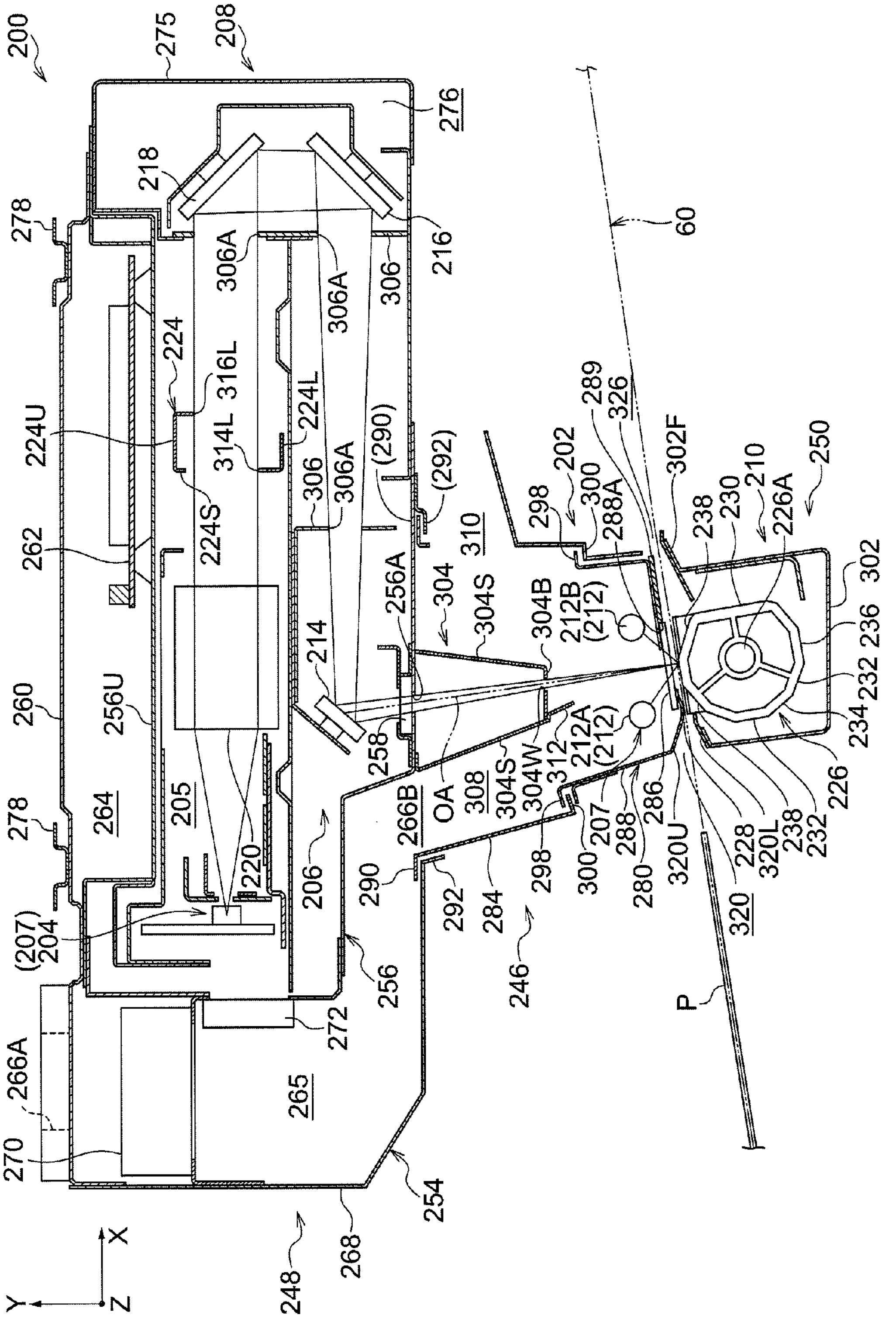
FIG. 3 is a configuration diagram showing an inline sensor according to the exemplary embodiment of the invention.

As shown in FIG. 3, the inline sensor 200 includes an emission unit 202 which emits a beam toward the recording medium P having an image recorded thereon, an imaging unit 208 which has an imaging optical system 206 forming an image in a CCD sensor 204 as an example of a beam receiving unit receiving the beam emitted from the emission unit 202 and reflected from the recording medium P, and a setting unit 210 which sets various reference values or the like for the use or the calibration of the inline sensor 200. The CCD sensor 204 receives the beam reflected from the recording medium P and detects the image or the recording medium P on the basis of the intensity of the beam.

Furthermore, the beam from the recording medium P includes the beam reflected from the recording medium P and the beam transmitted through the recording medium P, and in a broad sense, the beam is a beam used to detect information on the image formed on the recording medium P or the position or the shape of the recording medium P. Further, the transmitted beam includes the beam not only exiting the window glass or the like, but also the beam exiting the imaging lens or the like. Furthermore, the detection of the recording medium P includes the detection of the position and the shape of the recording medium P.

The emission unit 202 is disposed above the transportation path 60 of the recording medium P, and includes lamps 212 as an example of an emission member. Each lamp 212 is a xenon lamp which has a rectangular shape in the Z direction, and the length of the emission range is set to be larger than the width of the maximum recording medium P to be transported. The pair of lamps 212 is symmetrically disposed about the optical axis OA (the optical axis in design) reflected from the recording medium P and directed toward the imaging unit 208. More specifically, the lamps 212 are symmetrically disposed about the optical axis OA so that the emission angle thereof with respect to the recording medium P is from 45° to 50°.

Specifically, the pair of lamps 212 includes a first lamp 212A which is an example of a first beam source and is provided at the upstream of the transportation direction of the recording medium P and a second lamp 212B which is an example of a second beam source and is provided at the opposite side of the first lamp 212A with the optical axis OA interposed therebetween. Further, a detection unit 207 is configured as an example of a detection member detecting the image of the transported recording medium P, where the detection unit 207 includes the CCD sensor 204 and the lamps 212.

The imaging optical system 206 mainly includes a first mirror 214 which reflects a beam guided along the optical axis OA in the X direction (in the exemplary embodiment, the downstream side in the transportation direction of the recording medium P), a second mirror 216 which reflects the beam reflected by the first mirror 214 upward, a third mirror 218 which reflects the beam reflected by the second mirror 216 toward the upstream of the transportation direction of the recording medium P, and a lens 220 which allows the beam reflected by the third mirror 218 to be concentrated on the CCD sensor 204 (so that an image is formed thereon). The CCD sensor 204 is disposed at the upstream of the transportation direction of the recording medium P with respect to the optical axis OA.

The length of the first mirror 214 in the Z direction is set to be larger than the width of the maximum recording medium P. Then, the first mirror 214, the second mirror 216, and the third mirror 218 reflect the beam reflected from the recording medium P and entering the imaging optical system 206 while narrowing it in the Z direction (the secondary scanning direction). Accordingly, the reflected beams from the respective portions of the recording medium P in the width direction are made to enter the substantially cylindrical lens 220.

With the above-described configuration, in the inline sensor 200, the CCD sensor 204 is configured to output (feedback) a signal in accordance with the imaged beam, that is, the image density to a control device 192 provided at the first processing unit 10A of the image forming apparatus 10 (refer to FIG. 1). The control device 192 is configured to correct an image formed in the image forming unit 16 on the basis of the signal from the inline sensor 200. In the image forming apparatus 10, as an example, the intensity of the emission beam, the image formation position, and the like of the exposure device 40 are corrected on the basis of the signal from the inline sensor 200.

Further, a beam quantity diaphragm unit 224 is provided between the third mirror 218 and the lens 220 of the imaging optical system 206. The beam quantity diaphragm unit 224 decreases the quantity of the beam crossing the optical path in the Z direction and imaged at the CCD sensor 204 in the Y direction (the direction intersecting the primary scanning direction), and adjusts the degree of the beam quantity diaphragm through an operation from the outside. The degree of the beam quantity diaphragm using the beam quantity diaphragm unit 224 may be adjusted so that the quantity of the beam imaged at the CCD sensor 204 becomes a predetermined quantity even when the beam emission quantity of each lamp 212 changes with the elapse of time.

On the other hand, the setting unit 210 includes a reference roll 226 having a rectangular shape in the Z direction. The reference roll 226 includes a detection reference surface 228 which is directed toward the transportation path 60 when the image detection of the recording medium P is performed, a retreat surface 230 which is directed toward the transportation path 60 when the image detection of the recording medium P is not performed by the inline sensor 200, a white reference surface 232, a color reference surface 234 in which plural color patterns are formed along the length direction, and a complex detection surface 236 in which plural detection patterns are formed. In the exemplary embodiment, the reference roll 226 is formed in a polygonal cylindrical shape having eight or more surfaces in the circumferential direction. Each of the detection reference surface 228, the retreat surface 230, the color reference surface 234, and the complex detection surface 236 has only one surface, and the white reference surface 232 has two surfaces.

Further, the reference roll 226 is configured to switch the surface directed toward the transportation path 60 while rotating about the rotation shaft 226A. The switching of the surface of the reference roll 226 is performed by a control circuit (not shown) provided at a circuit board 262 to be described later. Further, since the reference roll 226 is formed in a cylindrical shape having a polygonal cross-section with eight corners or more, a difference in distance between the center of each surface in the circumferential direction and the corner portion of the surfaces with respect to the rotation center is suppressed to be small. Accordingly, the corner portion of the surfaces of the reference roll 226 is not interfered with the emission unit 202 while a distance between each surface of the reference roll 226 and the emission position of each lamp 212 (the window glass 286 to be described later) is suppressed to be small.

The circumferential width of the detection reference surface 228 is set to be smaller than the widths of the other surfaces as well as the width of the window glass 286 in the transportation direction of the recording medium P, where both circumferential surfaces are formed as guide surfaces 238 not serving as the above-described reference surfaces. Further, the detection reference surface 228 is formed as a positioning reference surface that positions the detecting target surface (reading target surface) of the transported recording medium P to be located at the emission position of each lamp 212.

The circumferential width of the retreat surface 230 is set to be larger than those of other surfaces. The retreat surface 230 is used as a guide surface guiding the recording medium P when the image detection of the recording medium P is not performed by the inline sensor 200, and the distance from the axis of the rotation shaft 226A to the retreat surface 230 is set to be smaller than that from the detection reference surface 228 to the retreat surface 230. Accordingly, when the image detection of the recording medium P is not performed by the inline sensor 200, the distance from the transportation path to the emission unit 202 (the window glass 286) is wider than that of the case where the image detection of the recording medium P is performed by the inline sensor 200.

The white reference surface 232 is used for the calibration of the imaging optical system 206, and a white film is stuck thereto so that the white reference surface 232 is used as a reference allowing a predetermined signal to output from the imaging optical system 206. The color reference surface 234 is used for the calibration of the imaging optical system 206, and a film having a pattern of a reference color is stuck thereto in accordance with each color.

Figure 6:
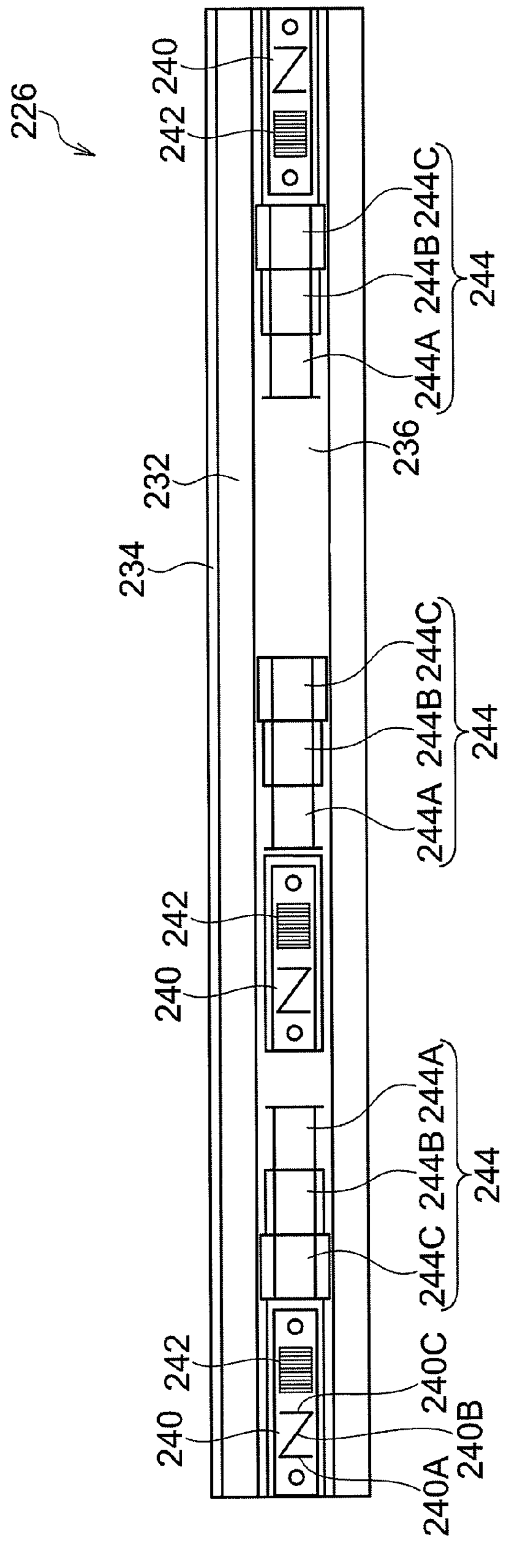
FIG. 6 is a configuration diagram showing a complex detection surface according to the exemplary embodiment of the invention.

As shown in FIG. 6, the complex detection surface 236 has a configuration in which a depth detection pattern 244, a focus detection pattern 242, and a position adjustment pattern 240 calibrating the position of the reference roll 226 in the rotation direction (in the transportation direction of the recording medium P) are disposed at the same surface.

The position adjustment pattern 240 is formed in a manner such that a film having a white background is stuck thereto so that the N-shaped vertical line of the black N-shaped pattern is formed on the film along the transportation direction of the recording medium P. The focus detection pattern 242 is formed in a manner such that a film having a white background is stuck thereto so that plural black lines along the width direction of the recording medium P are formed in parallel on the film as a ladder pattern.

The depth detection pattern 244 is formed in a manner such that a sheet member, having a pattern with three depth detection portions 244A, 244B, and 244C having different distances from the rotation shaft 226A (refer to FIG. 2) of the reference roll 226 disposed in a step shape in the length direction of the complex detection surface 236, is stuck thereto.

Here, at least one position adjustment pattern 240 is provided for each of both ends of the length direction of the complex detection surface 236. Further, the focus detection pattern 242 is disposed to be close to the center of the length direction of the complex detection surface 236 with respect to the position adjustment pattern 240 disposed at both ends. Three depth detection patterns 244 are provided in total to be respectively disposed at both end sides of the length direction of the complex detection surface 236 and the center portion thereof. In the exemplary embodiment, one position adjustment pattern 240 and one focus detection pattern 242 are disposed between the depth detection pattern 244 disposed at the center and the depth detection pattern 244 disposed at both ends in the length direction.

Next, a calibration procedure of the CCD sensor 204 will be described.

In FIG. 3, first, the white reference surface 232 is first directed toward the transportation path 60 of the recording medium P. Then, the CCD sensor 204 outputs a shading correction signal correcting the distribution of the quantity of the beam in the Z direction (the primary scanning direction). Subsequently, the complex detection surface 236 is directed toward the transportation path 60 of the recording medium P, and the detection position using the CCD sensor 204 is automatically adjusted in the transportation direction of the recording medium P in accordance with the position adjustment pattern 240 (refer to FIG. 6). That is, as shown in FIG. 6, two linear portions 240A and 240C and an oblique portion 240B therebetween are detected by detecting the N-shaped pattern in the Z direction (the primary scanning direction). Then, the reference roll 226 is rotated so that the distance between the linear portion 240A and the oblique portion 240B becomes equal to the distance between the linear portion 240C and the oblique portion 240B, and the detection position is adjusted.

Subsequently, after the detection position is adjusted in the transportation direction of the recording medium P, the focus of the CCD sensor 204 is checked by the focus detection pattern 242 (refer to FIG. 6), and the illumination depth degree is checked by the depth detection pattern 244. Furthermore, the color reference surface 234 is directed toward the transportation path 60 of the recording medium P. The CCD sensor 204 is automatically adjusted so that a signal having a predetermined intensity is output for each color.

Furthermore, as described above, the calibration of the CCD sensor 204 is performed, for example, before the image forming apparatus 10 is turned on (once per day). On the other hand, the calibration of the image forming apparatus 10 based on the signal of the CCD sensor 204 is performed, for example, whenever a predetermined quantity of an image is formed on the recording medium P (ten times per day).

(Separation Structure of Inline Sensor 200)

As shown in FIG. 3, the inline sensor 200 may be separated into three units, that is, the center unit 246 mainly including the emission unit 202, the upper unit 248 mainly including the imaging unit 208, and the lower unit 250 mainly including the setting unit 210.

The upper unit 248 is slidably attached to or detached from the second processing unit 10B of the image forming apparatus 10 (refer to FIG. 1) in the Z direction. The center unit 246 is slidably attached to or detached from the upper unit 248 in the Z direction. The lower unit 250 is slidably attached to or detached from the center unit 246 and the upper unit 248 in the Z direction. Furthermore, the lower unit 250 disposed below the transportation path 60 of the recording medium P is supported by a lower drawer (not shown) which is drawn from the second processing unit 10B toward the front side in the Z direction in order to solve the jamming of the recording medium P, and the lower unit is attachable to or detachable from the center unit 246 and the upper unit 248 when drawing out or inserting the lower drawer. Hereinafter, this configuration will be described in detail.

(Configuration of Upper Unit 248)

The upper unit 248 includes an upper housing 254. The upper housing 254 accommodates the imaging unit 208 and the circuit board 262 to be described later, and constitutes a cooling duct 265 and the like. The upper housing 254 includes an imaging system housing 256 accommodating the CCD sensor 204 and the imaging optical system 206.

The imaging system housing 256 has a rectangular box shape in the X direction when it is seen from the Z direction, and one end in the X direction (in the exemplary embodiment, the upstream end in the transportation direction of the recording medium P) accommodates the CCD sensor 204. Further, the other end of the imaging system housing 256 in the X direction is provided with the second mirror 216 and the third mirror 218. Then, the substantially center portion of the imaging system housing 256 in the X direction is provided with a window portion 256A to which a beam is incident along the optical axis OA. In the imaging system housing 256, the window portion 256A is blocked by a window glass 258 through which a beam is transmitted, whereby the interior thereof is formed as an air-tightly sealed space and an optical chamber 205 accommodating the CCD sensor 204 and the like.

Further, the upper housing 254 includes the upper cover 260 which covers the upper side of the imaging system housing 256. Accordingly, a substrate chamber 264 is provided between an upper wall 256U of the imaging system housing 256 and the upper cover 260 to accommodate the circuit board 262. Further, the upper housing 254 includes a duct cover 268 forming the duct 265 at the outside of one end in the X direction as the side where the CCD sensor 204 is disposed in the imaging system housing 256. The duct cover 268 covers the end of the imaging system housing 256 at the upstream and the downstream in the transportation direction of the recording medium P, and forms the duct 265 having an L-shaped X-Y cross-section.

Figure 4:
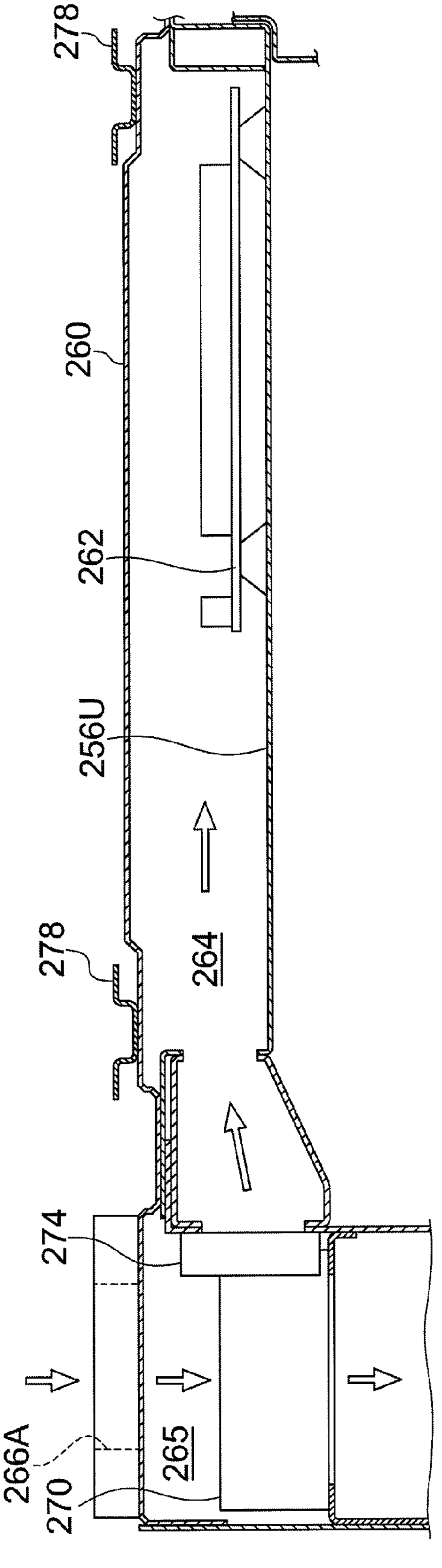
FIG. 4 is an explanatory diagram showing a state where air is sent to a substrate chamber according to the exemplary embodiment of the invention.

The upper end of the duct 265 is formed as an air introduction port 266A, and the end of the duct 265 opposite to the air introduction port 266A is formed as a connection port 266B connected to a duct 308 of a lamp housing 284 to be described later. A fan 270 is disposed in the duct 265 to generate an air stream moving from the upper side of the interior of the duct 265 to the lower side thereof. Further, a fan 272 is disposed in the duct 265 to supply air into the optical chamber 205 provided at the imaging system housing 256 (to allow the optical chamber 205 to have a constant pressure). Furthermore, a fan 274 (refer to FIG. 4) is provided at the duct 265 to supply air into the substrate chamber 264.

Furthermore, the upper housing 254 includes a cover 275 which covers the imaging system housing 256 at the side of the second mirror 216 and the third mirror 218. The cover 275 forms an insulation space 276 between the cover and the imaging system housing 256. Then, a slider 278 is provided at the upper housing 254 to be elongated in the Z direction. In the exemplary embodiment, a pair of sliders 278 is provided at the upper cover 260 to be in parallel as depicted by the arrow in the X direction. Each slider 278 is fittable to a rail provided at a frame (not shown) of the second processing unit 10B. Accordingly, each slider 278 moves while being guided on the rail, so that the upper unit 248 moves with respect to the second processing unit 10B in the Z direction.

(Configuration of Center Unit 246)

As shown in FIG. 3, the center unit 246 includes a lamp housing 284 which accommodates the pair of lamps 212, a window glass 286 which is an example of a transmissive member allowing the beam emitted from the lamp 212 toward the recording medium P to be transmitted therethrough, and a support cover 280 which is an example of a support member supporting the window glass 286.

The window glass 286 is disposed between the transportation path 60 of the recording medium P and the lamp 212 and is provided to face the transportation path 60. Further, the support cover 280 includes a first window cover 288 which is disposed at the upstream of the transportation direction of the recording medium P and a second window cover 289 which is disposed at the downstream thereof. Then, the lamp housing 284 is formed in a box shape to be opened upward and downward, where the upper open end is closed at the upper housing 254 and the lower open end is closed at the first window cover 288 and the second window cover 289.

Then, in the emission unit 202, a beam emitted from each lamp 212 is emitted to the recording medium P through the window glass 286, and the beam reflected from the recording medium P enters the lamp housing 284 along the optical axis OA through the window glass 286. The beam reflected from the recording medium P and entering the lamp housing 284 is guided into the imaging unit 208 through the window glass 258 of the imaging system housing 256 constituting the imaging unit 208.

The lamp housing 284 includes a pair of sliders 290 protruding in a flange shape in the direction indicated by the arrow of the X direction from the upper open edge and elongated in the Z direction. Each slider 290 is fitted to a rail 292 formed in the upper housing 254. Accordingly, each slider 290 moves while being guided on the rail 292, so that the lamp housing 284 is attachable to or detachable from the upper housing 254 (the upper unit 248) in the Z direction.

The support cover 280 includes the first window cover 288 and the second window cover 289 and is formed so that the edge of the support cover 280 and the edge of the window glass 286 are not directed toward the upstream of the transportation direction of the recording medium P. Both ends of the window glass 286 in the length direction are pressed against the first window cover 288 by a plate spring 334 (refer to FIG. 7) in a posture in which the window glass 286 blocks a window portion 288A as an example of an open portion formed by the first window cover 288 and the second window cover 289. That is, the window glass 286 is attachable to or detachable from the first window cover 288 and the second window cover 289. Furthermore, the structure of attaching the window glass 286 to the support cover 280 will be described later in detail.

Further, the support cover 280 is attachable to or detachable from the lamp housing 284. Specifically, the X-Y cross-section of the support cover 280 is formed in a rectangular U-shape so that the upper side is open, and the edge of the open portion is provided with a pair of sliders 298. Each the slider 298 is fitted to a rail 300 formed in the lamp housing 284. Accordingly, each slider 298 moves while being guided on the rail 300, so that the support cover 280 is attachable to or detachable from the lamp housing 284 in the Z direction. With this configuration, in the inline sensor 200, the support cover 280 may be replaced or cleaned as a single component.

Although not shown in the drawings, the center unit 246 and the upper unit 248 are highly precisely positioned in the X, Y, and Z directions by a pin and a hole which are inserted and separated with the relative movement in the Z direction. Further, the housings of the upper unit 248 and the second processing unit 10B (refer to FIG. 1) are highly precisely positioned in the X, Y, and Z directions by a pin and a hole which are inserted and separated with the relative movement in the Z direction.

(Configuration of Lower Unit 250)

As shown in FIG. 3, the lower unit 250 includes the reference roll 226 and a lower housing 302 accommodating a motor (not shown) driving the reference roll 226. As described above, the lower housing 302 is supported by the lower drawer and is positioned to the lower drawer in the Z direction. Further, the lower unit 250, the center unit 246, and the upper unit 248 are highly precisely positioned in the X, Y, and Z directions by a pin and a hole which are inserted and separated with the relative movement in the Z direction. Accordingly, the lower unit 250 having the transportation path 60 of the recording medium P between the center unit 246 and the lower unit 250 is positioned with respect to the center unit 246 and the upper unit 248 in the X, Y, and Z directions.

(Countermeasure for Stray Light)

As shown in FIG. 3, a baffle 304 is provided inside the lamp housing 284 to surround the optical axis OA above the pair of lamps 212 (212A and 212B). As shown in FIG. 3, the baffle 304 includes at least a pair of side walls 304S and a bottom wall 304B. In the exemplary embodiment, the pair of side walls 304S is connected to each other at a pair of front and rear walls (not shown) facing each other in the Z direction. Further, the bottom wall 304B is provided with a lower window portion 304W where the optical axis OA enters. The upper open end of the baffle 304 surrounds a window portion 256A of the imaging system housing 256. Accordingly, a beam traveling along the optical axis OA enters the imaging unit 208 through the interior of the baffle 304.

The dimension of the baffle 304 is set so that the beam emitted from the rear side of each lamp 212 does not reach the window portion 256A. That is, the position of the open edge of the lower window portion 304W is set so that the beam emitted from the rear side of each lamp 212 does not directly reach the window portion 256A. Further, the inclination angle of the side wall 304S with respect to the OA is set so that the beam does not reach the window portion 256A even when the beam emitted from the rear side of each lamp 212 is reflected once.

On the other hand, plural partition walls 306 is disposed inside the imaging system housing 256 to define a portion other than a beam guiding path of the imaging optical system 206. Each partition wall 306 includes an open portion 306A of which the size (upper limit) of the beam passing portion is set in a degree that the diffusion beam reflected from the recording medium P is not narrowed in the Y and Z directions in accordance with the diffusion angle of the beam reflected at the recording medium P.

(Air flow)

As shown in FIG. 3, the duct 308 is formed inside the lamp housing 284 by the side wall 304S and the peripheral wall of the lamp housing 284 at one side (in the exemplary embodiment, the upstream of the transportation direction of the recording medium P). The upper open end of the duct 308 is connected to the duct 265 through the connection port 266B while the lamp housing 284 is attached to the upper housing 254. Accordingly, the air stream generated by the operation of the fan 270 is also generated inside the lamp housing 284.

An air discharge port 310 is formed at a portion located at the opposite side of the duct 308 in the X direction of the peripheral wall of the lamp housing 284. Accordingly, the air stream from the duct 265 is guided inside the lamp housing 284 by the peripheral wall of the lamp housing 284 and the support cover 280, flows through the first lamp 212A at the upstream of the transportation direction of the recording medium P and the second lamp 212B at the downstream thereof, and is discharged to the outside of the lamp housing 284 through the air discharge port 310.

Further, a protrusion portion 312 protrudes from the lower end of the side wall 304S constituting the duct 308 so as to prevent the beam emitted from the rear side of the first lamp 212A from reaching the lower window portion 304W. The protrusion amount of the protrusion portion 312 is set so that the pair of lamps 212 is equally cooled by the air stream flowing toward the pair of lamps 212.

(Beam Quantity Diaphragm Unit)

As shown in FIG. 3, the beam quantity diaphragm unit 224 includes a side wall 224S, an upper wall 224U, and a lower wall 224L, and the X-Y cross-sectional shape thereof is formed in a rectangular U-shape to be opened toward the third mirror 218. A substantially rectangular open portion 314 is formed at the side wall 224S of the beam quantity diaphragm unit 224. Further, a rib 316 is suspended from a free end of the upper wall 224U. The beam quantity diaphragm unit 224 cuts the beam from the recording medium P at a lower edge 314L of the open portion 314 and a lower end 316L of the rib 316, and decreases the quantity of the beam in the Y direction.

One end of the beam quantity diaphragm unit 224 in the length direction reaches the front wall of the imaging system housing 256, and one end of the beam quantity diaphragm unit 224 in the length direction is attached with an operation lever (not shown) through an operation hole formed in the wall. Then, the beam quantity diaphragm unit 224 rotates with the operation of the operation lever and moves in a posture of gradually decreasing the aperture amount from the initial position where the quantity of the beam is the smallest.

(Jamming Prevention Structure)

Figure 5:
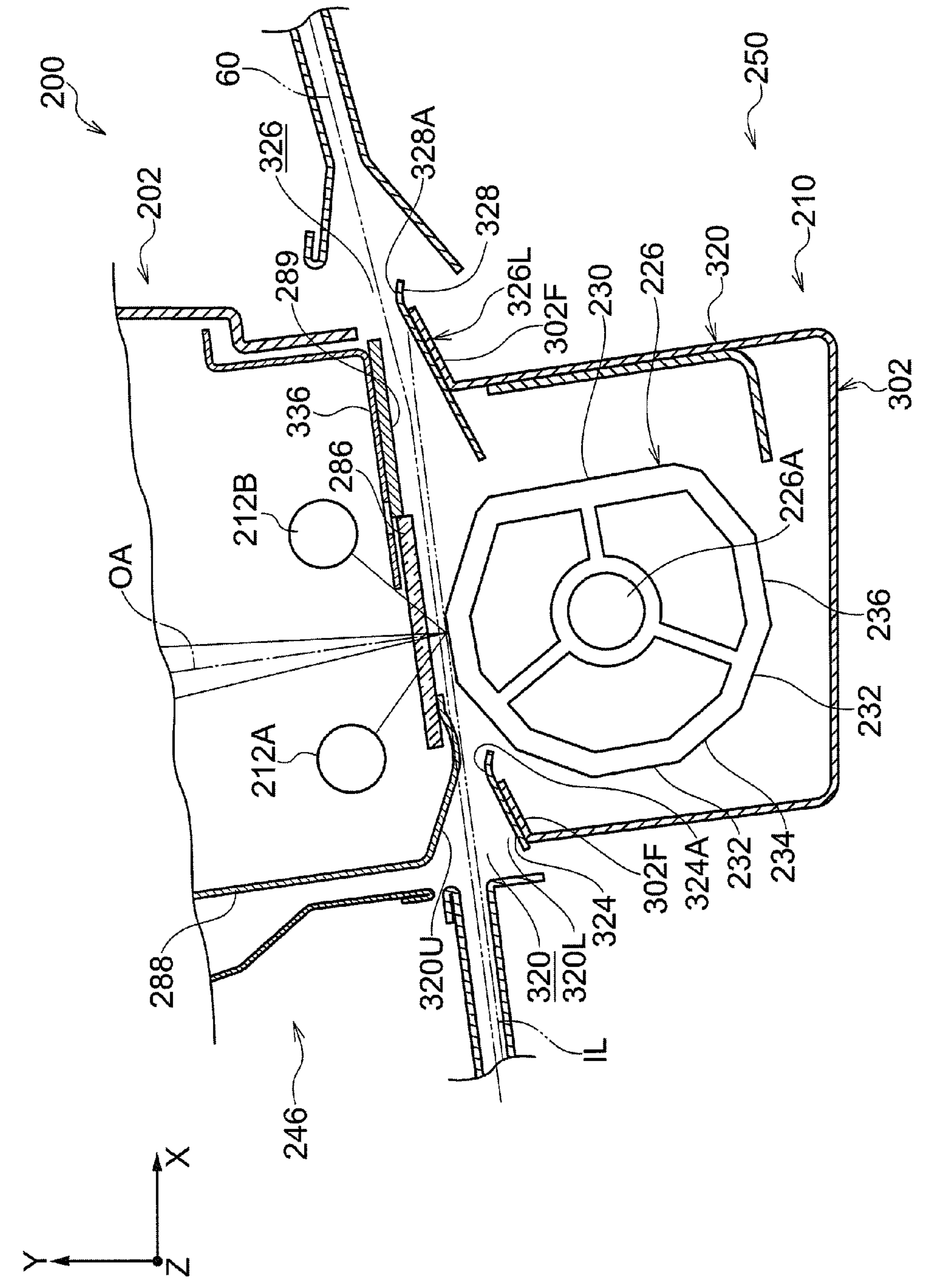
FIG. 5 is an enlarged cross-sectional view showing a transportation path of a recording medium in the inline sensor according to the exemplary embodiment of the invention.

As shown in FIG. 5, the transportation path 60 between the center unit 246 (the emission unit 202) and the lower unit 250 (the setting unit 210) is elevated toward the downstream side in the transportation direction of the recording medium P. Then, each corner portion of a first window cover 288 and the lower housing 302 is subjected to chamfering or R-chamfering. Accordingly, the inline sensor 200 is provided with an inlet chute 320 as an inducing portion directed toward the upstream of the transportation direction of the recording medium P and located closer to the upstream than the window glass 286.

An upper chute 320U forming the upper portion of the inlet chute 320 is formed as a smooth curved surface that is convex downward. Here, when an extension line of a detection reference surface 228 in the Z direction is denoted by IL while the detection reference surface 228 of the reference roll 226 is directed toward the transportation path 60 of the recording medium P, the dimension of the upper chute 320U is set so that the upper chute is interfered with the extension line IL (so that the protrusion end of the upper chute 320U is located below the extension line IL).

The lower chute 320L constituting the lower portion of the inlet chute 320 becomes closer to the reference roll 226 by the lower chute member 324 fixed to a flange 302F extending inward from the open end of the lower housing 302. Then, the downstream end of the lower chute member 324 in the transportation direction of the recording medium P is formed as an R-portion 324A that is convex upward.

An outlet chute 326 is formed between the lower housing 302 and the downstream portion of the transportation direction of the recording medium P in the convex portion 322. A lower chute 326L constituting the lower portion of the outlet chute 326 is formed by fixing a lower chute member 328 to a flange 302F extending outward from the open end of the lower housing 302. Then, the downstream end of the lower chute member 328 in the transportation direction of the recording medium P is formed as a round R-portion 328A that is convex upward.

Further, the detection reference surface 228 of the reference roll 226 is directed toward the recording medium P in a posture of substantially parallel to the window glass 286 when the image detection is performed by the CCD sensor 204. The guide surfaces 238 respectively provided at both sides of the detection reference surface 228 receive the recording medium P from the inlet chute 320, and guide the recording medium P toward the outlet chute 326.

On the other hand, the retreat surface 230 of the reference roll 226 is directed toward the recording medium P in a posture (non-parallel posture) of becoming closer to the window glass 286 approaching the downstream side in the transportation direction of the recording medium P when the image detection is not performed by the CCD sensor 204. Further, the retreat surface 230 is formed as a wide surface that extends from the R-portion 324A of the lower chute member 324 to the vicinity of the outlet chute 326, receives the recording medium P from the inlet chute 320 in the above-described posture, and guides the recording medium P toward the outlet chute 326.

(Operation of Inline Sensor 200)

As shown in FIG. 3, the inline sensor 200 emits a beam from the pair of lamps 212 to the recording medium P passing between the emission unit 202 and the setting unit 210. The beam reflected from the recording medium P is guided to the imaging unit 208 along the optical axis OA, and forms an image at the CCD sensor 204 by the imaging optical system 206 of the imaging unit 208. Subsequently, the CCD sensor 204 outputs a signal according to the image density for each position of the image to the control device 192 (refer to FIG. 1) of the image forming apparatus 10. Then, in the control device 192, the image density, the image formation position, and the like are corrected on the basis of the signal from the CCD sensor 204.

On the other hand, when the calibration of the CCD sensor 204 constituting the inline sensor 200 is performed, the motor of the lower unit 250 is first operated so that the white reference surface 232 is directed toward the transportation path 60 of the recording medium P. The CCD sensor 204 is adjusted so that a predetermined signal is output therefrom.

Subsequently, the complex detection surface 236 (refer to FIG. 6) is directed toward the transportation path 60 of the recording medium P, and the detection position of the CCD sensor 204 is adjusted so that the gap between the linear portion 240A and the oblique portion 240B of the position adjustment pattern 240 (refer to FIG. 6) becomes equal to the gap between the linear portion 240C and the oblique portion 240B. Subsequently, the CCD sensor 204 checks its focus state by using the focus detection pattern 242. Further, the emission depth is checked by the depth detection pattern 244. Furthermore, the color reference surface 234 (refer to FIG. 6) is directed toward the transportation path 60 of the recording medium P. Then, the CCD sensor 204 is adjusted so that a predetermined signal for each color is output therefrom.

(Configuration of Main Part)

Next, the structure of attaching the window glass 286 to the support cover 280 will be described in detail.

Figure 7:
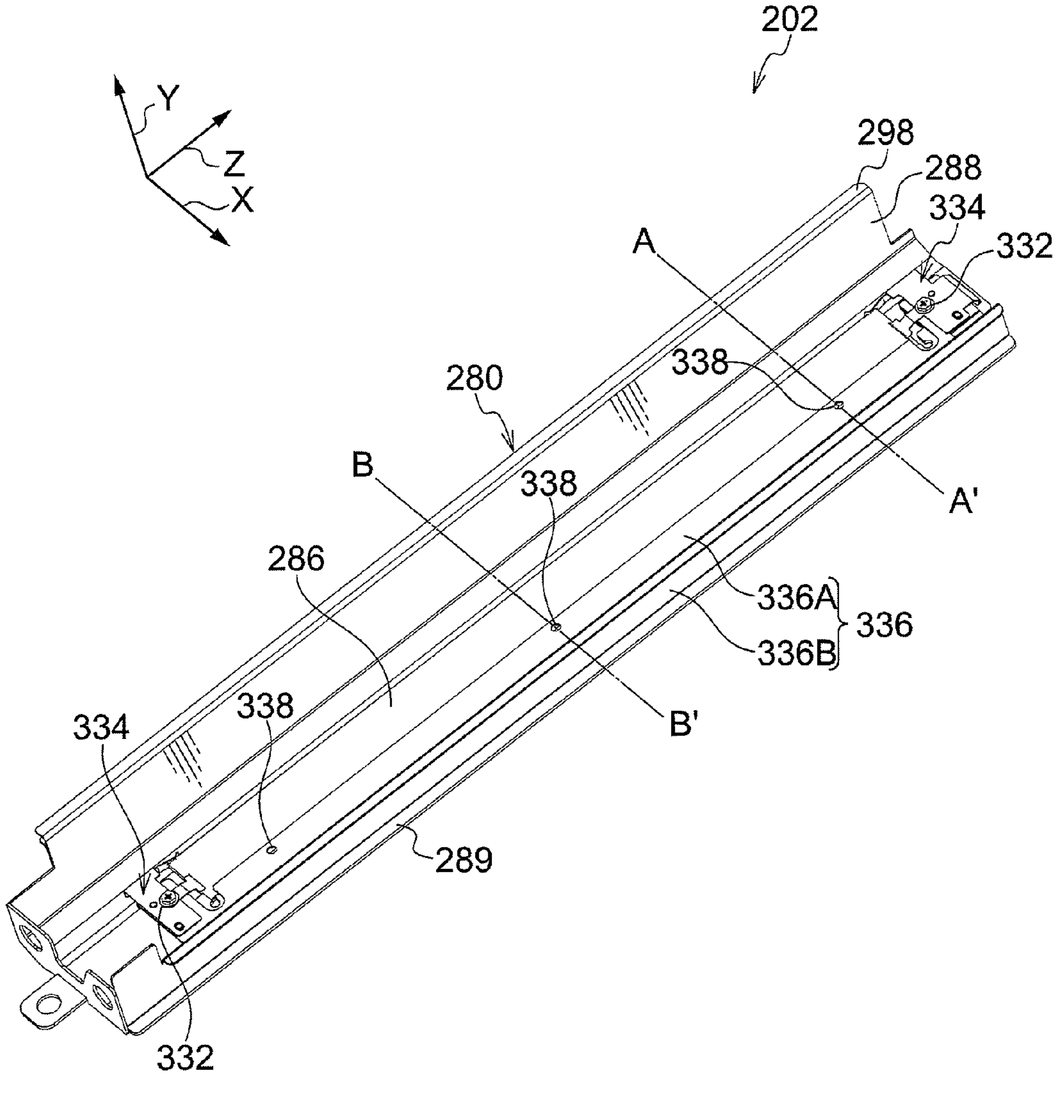
FIG. 7 is a perspective view showing a support cover and a window glass of an emission unit according to the exemplary embodiment of the invention.

As shown in FIG. 7, the window glass 286 is supported by the support cover 280. Specifically, one end portion of the window glass 286 in the X direction is supported by the first window cover 288 from the lower side (the side of the recording medium P), and the other end portion thereof in the X direction is supported by the second window cover 289 from the side thereof in the direction from the downstream side in the transportation direction of the recording medium P toward the upstream side. Further, both end portions of the window glass 286 in the Z direction are respectively pressed by the plate spring 334. Furthermore, a regulation member 336 is provided above the other end portion of the window glass 286 in the X direction (the area at the downstream side in the transportation direction of the recording medium P and at the outer side of the window portion 288A (refer to FIG. 5)), where the regulation member 336 is as an example of a suppressing member suppressing the downstream end portion of the window glass 286 in the transportation direction of the recording medium P from moving toward the lamp 212 (refer to FIG. 3).

The regulation member 336 is a member formed in a shape in which one plate member is bent at a right angle from the center portion thereof in the short direction and one end portion in the short direction is bent at a right angle in the reverse direction, and includes a flat portion 336A, a wall portion 336B uprightly formed with respect to the flat portion 336A, and the slider 298. Then, the regulation member 336 is attached to the upper surface of the second window cover 288 so that the flat portion 336A covers the other end portion of the window glass 286 (one end portion in the X direction).

Figure 8:
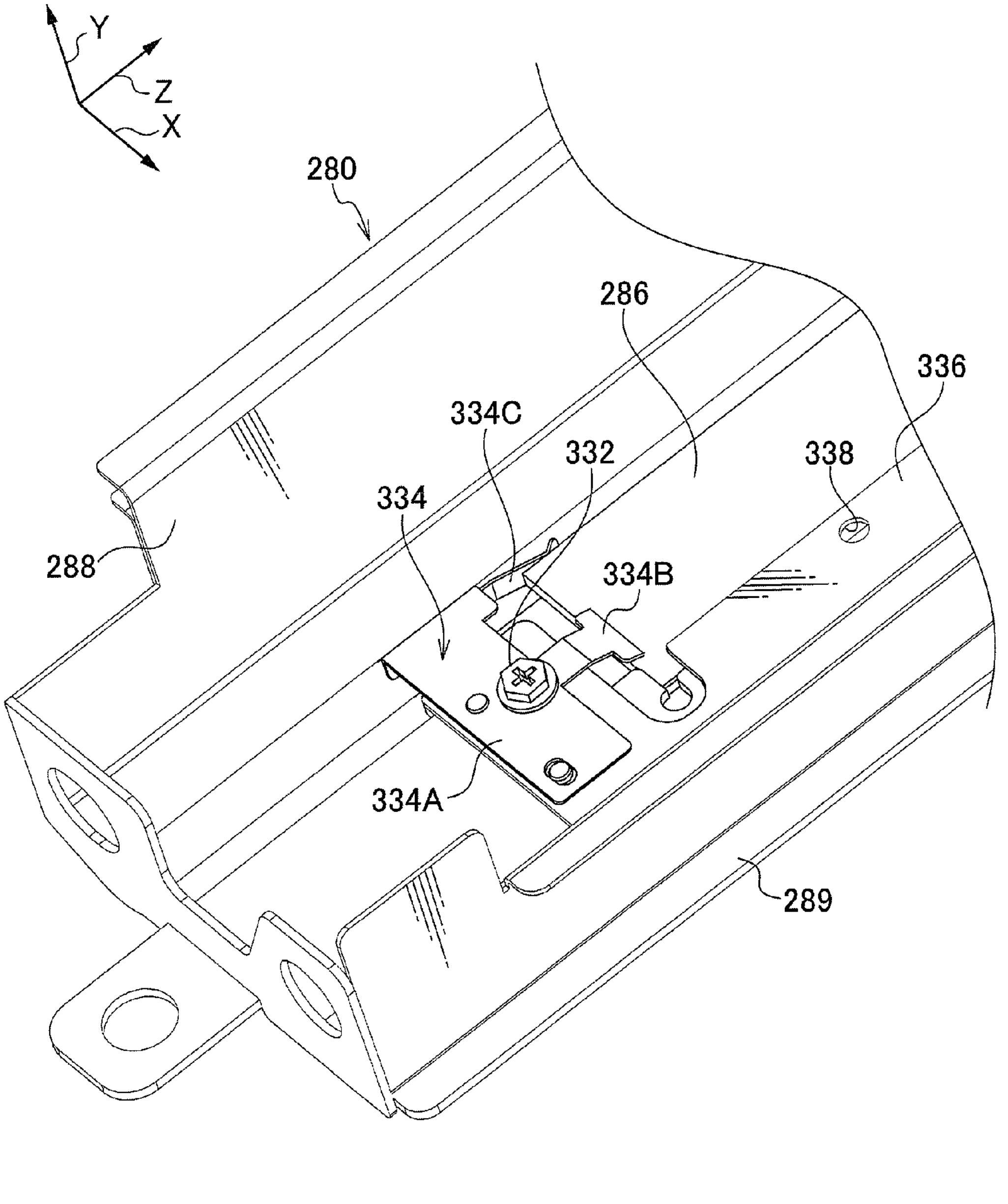
FIG. 8 is a partially enlarged diagram showing one end portion of the support cover according to the exemplary embodiment of the invention.

As shown in FIG. 8, the plate spring 334 includes a rectangular attachment portion 334A which is fixed to the bottom surface of the end portions of the first window cover 288 and the second window cover by a screw 332, a first biasing portion 334B which protrudes from the attachment portion 334A in the Z direction and of which the front end is bent downward in a reverse V-shape, and a second biasing portion 334C which is formed by perpendicularly bending one end of the attachment portion 334A in the X direction and of which the front end is bent in a reverse V-shape toward the window glass 286. Furthermore, since one end side (the front side) of the plate spring 334 and the other end side (the rear side) thereof in the Z direction have the same configuration, in FIG. 8, only the plate spring 334 at one side is shown, and the plate spring 334 at the other side is not shown.

Figure 9:
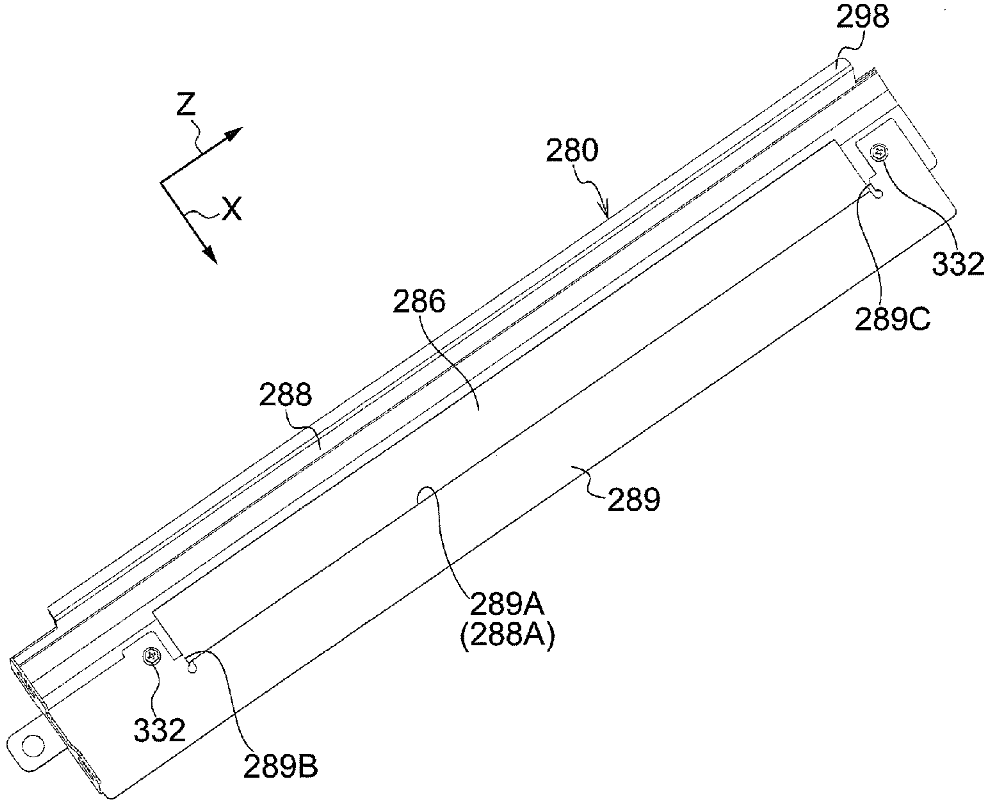
FIG. 9 is a perspective view showing a state where the window glass is supported by the support cover according to the exemplary embodiment of the invention.

As shown in FIG. 9, the second window cover 289 is formed as a plate member having a rectangular U-shaped bottom portion in the plan view, and the bottom portion includes a support side surface 289A facing the first window cover 288 in the X direction and support side surfaces 289B and 289C facing each other in the Z direction. Furthermore, the support side surface 289A forms a part of the window portion 288A. Further, in FIG. 9, the plate spring 334 and the regulation member 336 are not shown.

The window glass 286 is disposed inside the support cover 280 so that the Z direction is set as the length direction and the X direction is set as the short direction, and is positioned in a manner such that one side surface in the X direction contacts the support side surface 289A (the front side in the drawing) and one side surface in the Z direction contacts the support side surface 289B (the front side in the drawing). In this positioning state, as shown in FIG. 8, the window glass 286 is biased downward by the first biasing portion 334B of the plate spring 334 and is biased toward the second window cover 289 by the second biasing portion 334C, so that it is fixed to the support cover 280.

Figure 10:
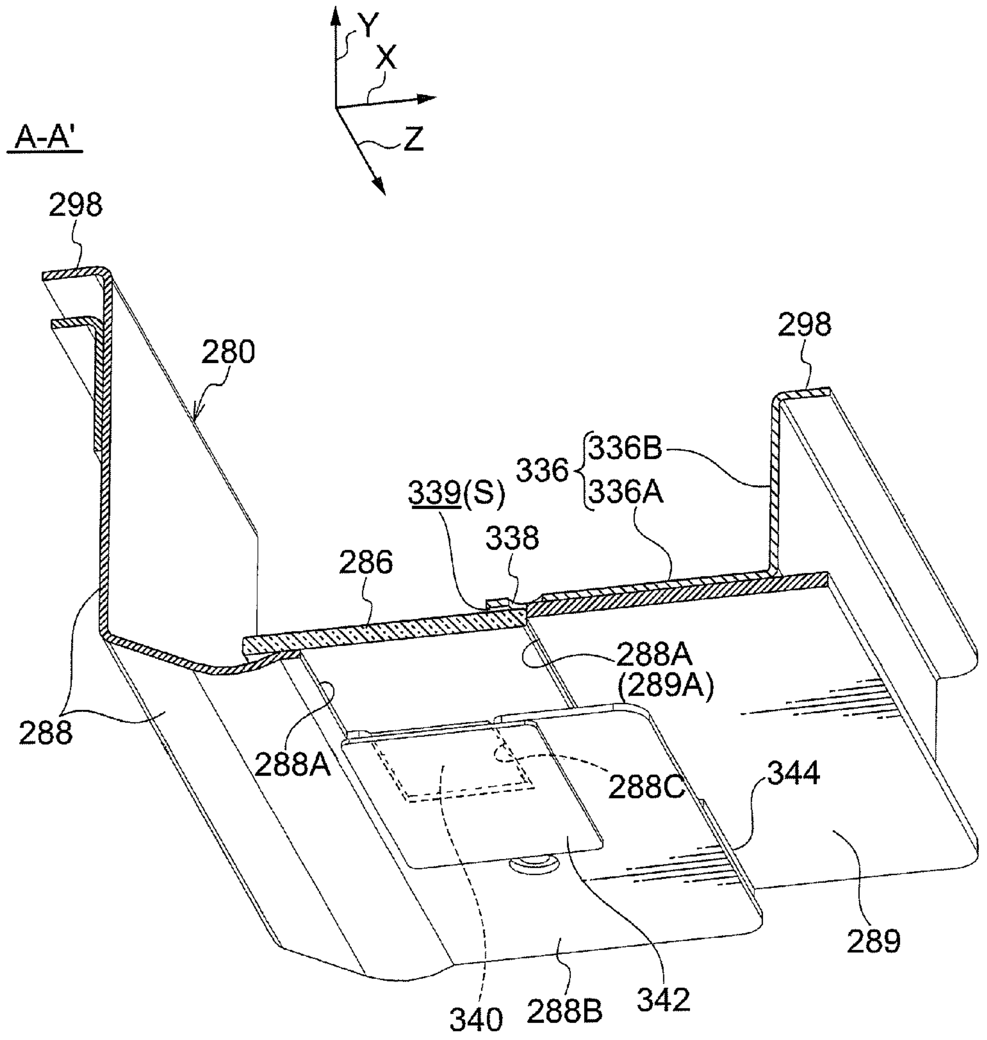
FIG. 10 is a perspective view showing a configuration of the other end portions of the support cover and the window glass in the emission unit according to the exemplary embodiment of the invention.

FIG. 10 is a perspective view showing the cross-section obtained by cutting the support cover 280 and the window glass 286 along the one-dotted chain line A-A' in FIG. 7. In the support cover 280, the first window cover 288 supports the upstream end portion of the window glass 286 in the X direction (the transportation direction of the recording medium P) at the upstream portion of the window portion 288A toward the recording medium P. Further, in the second window cover 289, the downstream portion (the support side surface 289A) in the edge portion of the window portion 288A is located closer to the lamps 212A and 212B (refer to FIG. 5) than the bottom surface of the window glass 286.

The flat portion 336A of the regulation member 336 is provided with a through-hole 338 passing through the flat portion 336A toward the downstream end portion of the window glass 286 in the X direction. Then, an adhesive S is supplied from the through-hole 338 so that a gap 339 between the window glass 286 and the flat portion 336A is filled with the adhesive and the adhesive is solidified. Accordingly, the window glass 286 is fixed to the upstream portion of the regulation member 336 further upstream than the through-hole 338.

On the other hand, both end portions of the first window cover 288 in the Z direction (the area portions outside of the area through which the recording medium P passes) protrude toward the downstream side in the X direction, so that a planar protrusion portion 288B is formed. Then, a gap between the protrusion portion 288B of the first window cover 288 and the second window cover 289 is provided with a spacer 334 which is an example of a step member for ensuring a step between the bottom surface of the window glass 286 and the bottom surface of the window portion 288A further downstream in the transportation direction than the edge portion of the downstream portion (the second window cover 289). Further, the protrusion portion 288B covers a part of the bottom surface of both end portions of the window glass 286 and the bottom surface of the second window cover 289, and a rectangular U-shaped notch portion 288C is formed at a portion which is visible when it is seen from the upper side of the window glass 286. A white reference plate 340 is disposed inside the notch portion 288C.

The white reference plate 340 is used for the calibration of the CCD sensor 204 (refer to FIG. 3), and is interposed between the window glass 286 and the support plate 342 in a manner such that the support plate 342 is adhered and fixed to the protrusion portion 288B of the first window cover 288 to cover the lower side of the notch portion 288C. Furthermore, in FIG. 10, the end portion of the white reference plate 340 is exposed. However, in order to prevent the intrusion of dust and the like, a configuration may be adopted in which a rectangular hole portion is formed instead of the notch portion 288C, the white reference plate 340 is disposed, and the support plate 342 is fixed.

Figure 11:
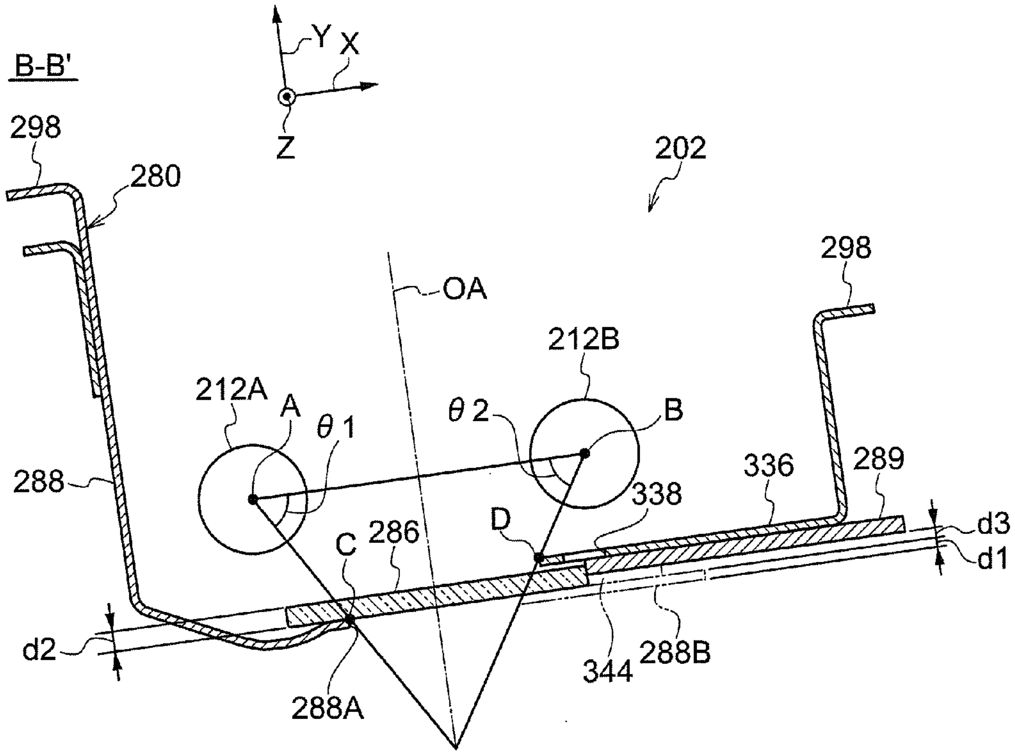
FIG. 11 is a schematic diagram showing the arrangement of lamps in the emission unit according to the exemplary embodiment of the invention.

FIG. 11 is a cross-sectional view taken along the one-dotted chain line B-B' in FIG. 7 in the support cover 280 and the window glass 286. Here, when the first lamp 212A and the second lamp 212B of the emission unit 202 are seen in the Z direction, the center of the first lamp 212A is denoted by A, the center of the second lamp 212B is denoted by B, the edge of the upstream portion of the window portion 288A is denoted by C, and the edge of the downstream portion of the window portion 288A is denoted by D, the first lamp 212A and the second lamp 212B are disposed at a position where the angle BAC (angle θ1) and the angle ABD (angle θ2) are equal to each other.

Further, in the emission unit 202, when the thickness of the second window cover 289 in the Y direction is denoted by d1, the thickness of the window glass 286 is denoted by d2, and the thickness of the spacer 344 is denoted by d3, the thicknesses of the respective members are set in advance so that an inequality of $d3<d2<(d1+d3)$ is satisfied. As a result, since the recording medium P does not contact the edge of the downstream portion of the window portion 288A of the support cover 280, jamming of the recording medium P does not occur. Furthermore, an anti-vibration effect inside the window glass 286 (inside the support cover 280) may be obtained.

Next, a comparative example will be described.

Figure 13:
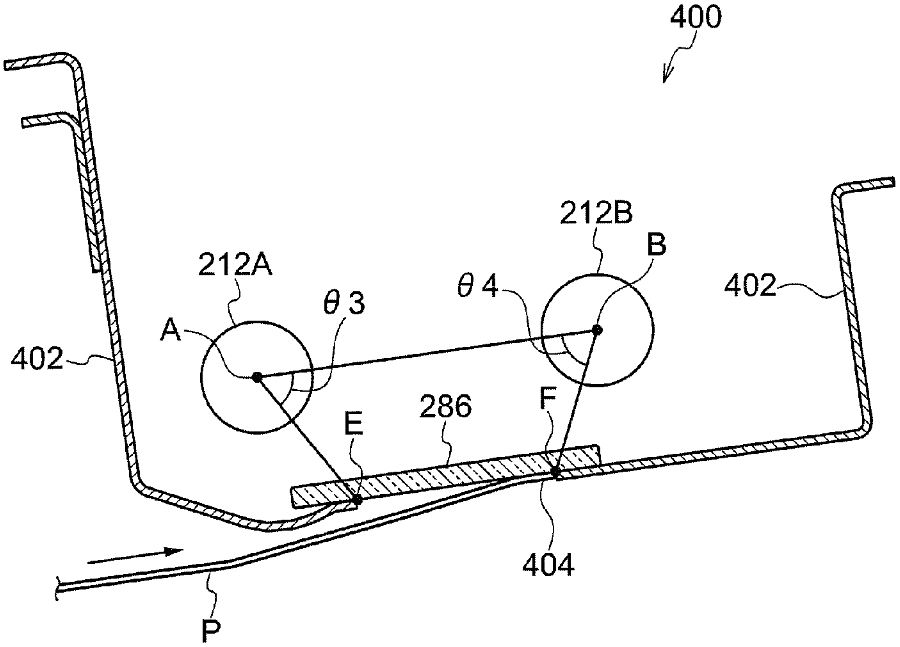
FIG. 13 is an explanatory diagram showing a state where a recording medium is transported to an emission unit according to a comparative example.

FIG. 13 shows the cross-section (X-Y plane) of an emission unit 400 of the comparative example. The emission unit 400 is different from the emission unit 202 (refer to FIG. 11) of the exemplary embodiment in that a support cover 402 is provided instead of the support cover 280 and the spacer 344 is not provided. Furthermore, description of members which are the same as those of the emission unit 202 will not be repeated.

The support cover 402 has a rectangular U-shaped cross-section (X-Y plane), and the bottom portion thereof is provided with a rectangular open portion 404. Then, the window glass 286 is adhered and fixed onto the edge portion of the open portion 404. For this reason, in the emission unit 400 of the comparative example, the edge of the upstream portion and the edge of the downstream portion of open portion in the transportation direction of the recording medium P are disposed at a side that is lower than the bottom surface of the window glass 286.

Further, in the emission unit 400, when the first lamp 212A and the second lamp 212B are viewed from the Z direction, the center point of the first lamp 212A is set as the point A, the center point of the second lamp 212B is set as the point B, the edge of the upstream portion of the open portion 404 is set as the point E, and the edge of the downstream portion of the open portion 404 is set as the point F. In this state, the angle BAE (angle θ3) and the angle ABF (angle θ4) are different from each other.

Here, in the emission unit 400, the downstream end surface of the open portion 404 is located at the side that is lower than the bottom surface of the window glass 286. Accordingly, this portion is formed as a step, and the front end of the transported recording medium P contacts the downstream end surface of the open portion 404. Accordingly, the recording medium P contacting the open portion 404 is bent or jammed. Further, in the emission unit 400, when the recording medium P contacts the bottom surface of the window glass 286 and upward stress acts on the window glass 286, the window glass 286 may be deviated since there is no member regulating the movement of the window glass 286.

Furthermore, in the emission unit 400, since the first lamp 212A and the second lamp 212B are disposed at a position where the angle θ3 and the angle θ4 are different from each other, the intensity distribution of the beam emitted from the first lamp 212A is different from the intensity distribution of the beam emitted from the second lamp 212B at a position where the image of the recording medium P is read, so that the intensity distribution of the beam is biased and an error occurs in the intensity distribution of the beam reflected from the image of the recording medium P.

Next, effects of the exemplary embodiment will be described.

Figure 12:
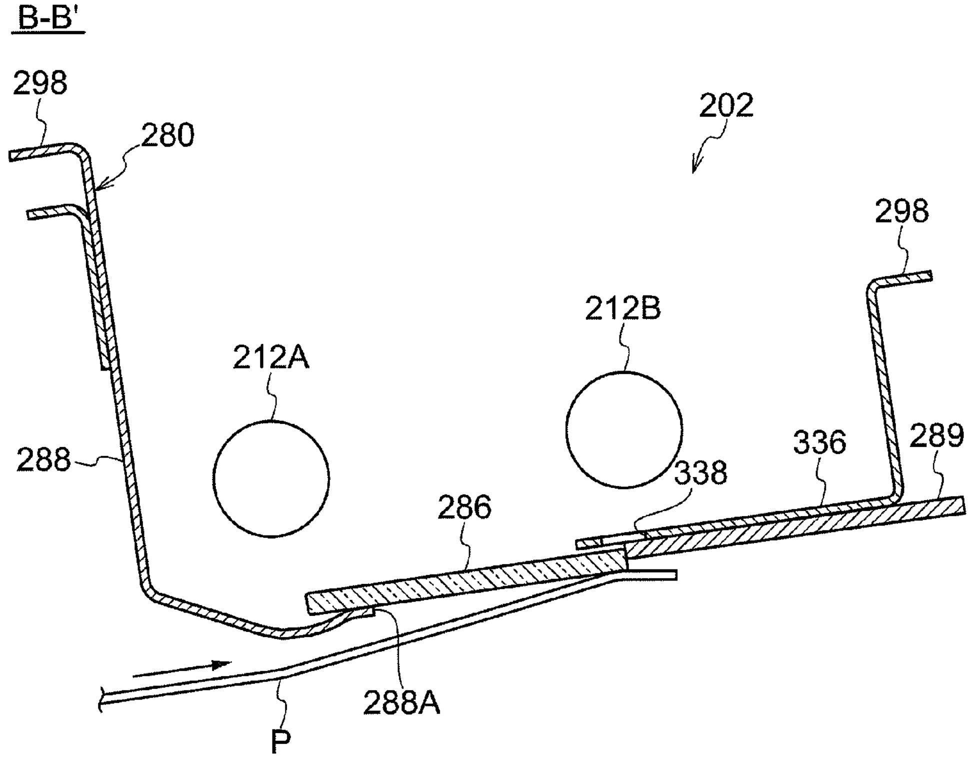
FIG. 12 is an explanatory diagram showing a state where the recording medium P is transported to the emission unit according to the exemplary embodiment of the invention.

As shown in FIG. 12, in the emission unit 202 of the exemplary embodiment, since the edge portion of the downstream portion of the window portion 288A of the support cover 280 is disposed closer to the first lamps 212A and 212B than the bottom surface of the window glass 286, the downstream portion (the end surface) of the window portion 288A is not exposed to the transportation path 60 of the recording medium P (refer to FIG. 3). Accordingly, even when the front end of the transported recording medium P contacts the bottom surface of the window glass 286, the front end does not contact the edge portion of the window portion 288A of the support cover 280, so that jamming of the recording medium P does not occur. Furthermore, since the lower side of the upstream end portion of the window glass 286 is supported by the first window cover 288, the recording medium P does not contact the upstream end surface of the window glass 286.

Further, in the emission unit 202, when the recording medium P contacts the bottom surface of the window glass 286 and upward stress acts on the window glass 286, the upward movement of the window glass 286 is regulated by the regulation member 336. Here, in the emission unit 202, since adhesive is supplied from the through-hole 338 of the regulation member 336 so that the gap between the regulation member 336 and the window glass 286 is filled with the adhesive and the adhesive is solidified, the adhesive may be easily applied to the downstream end portion of the window glass 286.

Furthermore, as shown in FIG. 11, in the emission unit 400, the first lamp 212A and the second lamp 212B are disposed at a position where the angle θ1 and the angle θ2 are equal to each other. Accordingly, the intensity distribution of the beam emitted from the first lamp 212A is equal to the intensity distribution of the beam emitted from the second lamp 212B at a position where the image of the recording medium P is read, so that the intensity distribution of the beam is less biased.

In addition, since, in the Y direction, the thickness d1 of the second window cover 289, the thickness d2 of the window glass 286, and the thickness d3 of the spacer 344 are set in advance so that the inequality of $d3<d2<(d1+d3)$ is satisfied, the rigidity of the first window cover 288 is improved compared to the configuration in which the spacer 344 is not provided at the upper surface of the first window cover 288.

As the image detection member, a contact type sensor may be used instead of the CCD sensor 204 or an optical sensor unit including the CCD sensor 204 may be used in combination with a contact type sensor while the window glass 286 is not removed. Further, the support portion of the second window cover 289 supporting the side portion of the window glass 286 is not limited to the entire Z direction, but may be divided into plural positions in the Z direction. Furthermore, in the exemplary embodiment, the front surface side of the recording medium P is exposed to the beam, but the rear surface side of the recording medium P may be exposed to the beam when the transparent recording medium P is used.

Further, the foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A detection device comprising:

a detection member that includes an emission member emitting a beam toward a transportation direction of a transportation path at which a medium is transported and a beam receiving member receiving a reflected beam of the beam emitted from the emission member, and that detects an image on the medium transported at the transportation path;

a transmissive member that is disposed between the transportation path and the emission member and that allows the beam emitted from the emission member and a beam reflected from the medium to be transmitted therethrough; and a support member that has an open portion blocked by the transmissive member, the support member comprising:

a first portion that supports an upstream end portion of the transmissive member in the transportation direction of the medium and is provided at a transportation path side below the upstream end portion of the transmissive member, and a second portion that supports an edge portion of a downstream end portion of the transmissive member in the transportation direction of the medium and is provided at an emission member side over the downstream end portion of the transmissive member.

2. The detection device of claim 1, further comprising:

a suppressing member which is attached to the support member to suppress a downstream end portion of the transmissive member in the transportation direction from moving toward the emission member.

3. The detection device of claim 2, wherein the suppressing member further comprises a through-hole that passes through the suppressing member to be formed toward the downstream end portion of the transmissive member, and wherein the transmissive member is fixed by an adhesive to an upstream portion of the suppressing member further upstream in the transportation direction than the through-hole of the suppressing member.

4. The detection device of claim 1, wherein the emission member includes a first beam source disposed at an upstream side in the transportation direction of the medium and a second beam source disposed at a downstream side in the transportation direction of the medium, and wherein a center of the first beam source is denoted by A, a center of the second beam source is denoted by B, an edge portion of the upstream portion of the open portion is denoted by C, and the edge portion of the downstream portion of the open portion is denoted by D when the first and second beam sources are seen from a direction intersecting the transportation direction, an angle BAC is equal to an angle ABD.

5. The detection device of claim 1, further comprising:

a step member that is provided at the support member to form a step between the bottom surface of the transmissive member and a bottom surface of the open portion of the support member further downstream in the transportation direction than an edge portion of a downstream portion of the open portion, and wherein a thickness of the support member is denoted by d1, a thickness of the transmissive member is denoted by d2, and a thickness of the step member is denoted by d3, and an inequality of d3<d2<(d1+d3) is satisfied.

6. An image forming apparatus comprising:

an image forming unit that forms an image on the medium;

a transportation unit that transports the medium having the image formed thereon by the image forming unit; and the detection device of claim 1 that detects the image on the medium transported by the transportation unit.

7. A detection device comprising:

a detection member that includes an emission member emitting a beam toward a transportation direction of a transportation path at which a medium is transported and a beam receiving member receiving a reflected beam of the beam emitted from the emission member, and that detects an image on the medium transported at the transportation path;

a transmissive member that is disposed between the transportation path and the emission member and that allows the beam emitted from the emission member and a beam reflected from the medium to be transmitted therethrough; and a support member that has an open portion blocked by the transmissive member, the support member comprising:

a first portion that supports an upstream end portion of the transmissive member in the transportation direction of the medium and is provided at a transportation path side below the upstream end portion of the transmissive member, and a second portion that supports an edge portion of a downstream end portion of the transmissive member in the transportation direction of the medium and is provided at an emission member side at a predetermined distance from a bottom of the downstream end portion of the transmissive member.

8. The detection device of claim 7, further comprising:

a suppressing member which is attached to the support member to suppress a downstream end portion of the transmissive member in the transportation direction from moving toward the emission member.

9. The detection device of claim 8, wherein the suppressing member further comprises a through-hole that passes through the suppressing member to be formed toward the downstream end portion of the transmissive member, and wherein the transmissive member is fixed by an adhesive to an upstream portion of the suppressing member further upstream in the transportation direction than the through-hole of the suppressing member.

10. The detection device of claim 7, wherein the emission member includes a first beam source disposed at an upstream side in the transportation direction of the medium and a second beam source disposed at a downstream side in the transportation direction of the medium, and wherein a center of the first beam source is denoted by A, a center of the second beam source is denoted by B, an edge portion of the upstream portion of the open portion is denoted by C, and the edge portion of the downstream portion of the open portion is denoted by D when the first and second beam sources are seen from a direction intersecting the transportation direction, an angle BAC is equal to an angle ABD.

11. The detection device of claim 7, further comprising:

a step member that is provided at the support member to form a step between the bottom surface of the transmissive member and a bottom surface of the open portion of the support member further downstream in the transportation direction than an edge portion of a downstream portion of the open portion, and wherein a thickness of the support member is denoted by d1, a thickness of the transmissive member is denoted by d2, and a thickness of the step member is denoted by d3, and an inequality of d3<d2<(d1+d3) is satisfied.

12. An image forming apparatus comprising:

an image forming unit that forms an image on the medium;

a transportation unit that transports the medium having the image formed thereon by the image forming unit; and the detection device of claim 7 that detects the image on the medium transported by the transportation unit.

13. A detection device comprising:

a detection member that includes an emission member emitting a beam toward a transportation direction of a transportation path at which a medium is transported and a beam receiving member receiving a reflected beam of the beam emitted from the emission member, and that detects an image on the medium transported at the transportation path;

a transmissive member that is disposed between the transportation path and the emission member and that allows the beam emitted from the emission member and a beam reflected from the medium to be transmitted therethrough; and a support member that has an open portion blocked by the transmissive member, the support member comprising:

a first portion that supports an upstream end portion of the transmissive member in the transportation direction of the medium and is provided at a transportation path side between the upstream end portion of the transmissive member and the medium, and a second portion that supports an edge portion of a downstream end portion of the transmissive member in the transportation direction of the medium and is provided at an emission member side between the downstream end portion of the transmissive member and the emission member.

14. The detection device of claim 13, further comprising:

a suppressing member which is attached to the support member to suppress a downstream end portion of the transmissive member in the transportation direction from moving toward the emission member.

15. The detection device of claim 14, wherein the suppressing member further comprises a through-hole that passes through the suppressing member to be formed toward the downstream end portion of the transmissive member, and wherein the transmissive member is fixed by an adhesive to an upstream portion of the suppressing member further upstream in the transportation direction than the through-hole of the suppressing member.

16. The detection device of claim 13, wherein the emission member includes a first beam source disposed at an upstream side in the transportation direction of the medium and a second beam source disposed at a downstream side in the transportation direction of the medium, and wherein a center of the first beam source is denoted by A, a center of the second beam source is denoted by B, an edge portion of the upstream portion of the open portion is denoted by C, and the edge portion of the downstream portion of the open portion is denoted by D when the first and second beam sources are seen from a direction intersecting the transportation direction, an angle BAC is equal to an angle ABD.

17. The detection device of claim 13, further comprising:

a step member that is provided at the support member to form a step between the bottom surface of the transmissive member and a bottom surface of the open portion of the support member further downstream in the transportation direction than an edge portion of a downstream portion of the open portion, and wherein a thickness of the support member is denoted by d1, a thickness of the transmissive member is denoted by d2, and a thickness of the step member is denoted by d3, and an inequality of $d3<d2<(d1+d3)$ is satisfied.

18. An image forming apparatus comprising:

an image forming unit that forms an image on the medium;

a transportation unit that transports the medium having the image formed thereon by the image forming unit; and the detection device of claim 13 that detects the image on the medium transported by the transportation unit.

* * * * *